US010735497B2

(12) United States Patent
Yin

(10) Patent No.: US 10,735,497 B2
(45) Date of Patent: Aug. 4, 2020

(54) METHOD AND SYSTEM FOR SECURELY IDENTIFYING USERS

(71) Applicant: Alibaba Group Holding Limited, George Town (KY)

(72) Inventor: Guanghui Yin, Hangzhou (CN)

(73) Assignee: Alibaba Group Holding Limited (KY)

( * ) Notice: Subject to any disclaimer, the term of this patent is extended or adjusted under 35 U.S.C. 154(b) by 51 days.

(21) Appl. No.: 14/745,225

(22) Filed: Jun. 19, 2015

(65) Prior Publication Data

US 2015/0371020 A1 Dec. 24, 2015

(30) Foreign Application Priority Data

Jun. 24, 2014 (CN) .......................... 2014 1 0287394

(51) Int. Cl.
*H04L 9/32* (2006.01)
*G06F 21/31* (2013.01)
*G06F 21/62* (2013.01)
*H04L 29/08* (2006.01)
*G06F 21/45* (2013.01)
*H04L 29/06* (2006.01)

(52) U.S. Cl.
CPC .............. *H04L 67/10* (2013.01); *G06F 21/31* (2013.01); *G06F 21/45* (2013.01); *H04L 63/08* (2013.01); *G06F 2221/2103* (2013.01); *G06F 2221/2131* (2013.01)

(58) Field of Classification Search
CPC . H04L 9/21; H04L 63/08; H04L 63/10; H04L 63/20; H04L 63/102; G06F 21/31; G06F 21/45; G06F 21/62
USPC .......................... 726/1–4, 16, 17, 21, 26–28
See application file for complete search history.

(56) References Cited

U.S. PATENT DOCUMENTS

| 5,774,525 A | 6/1998 | Kanevsky et al. |
| 7,373,671 B2 | 5/2008 | Gudorf et al. |
| 8,769,276 B2 | 7/2014 | Noh et al. |
| 9,092,599 B1 * | 7/2015 | Kronrod ................. G06F 21/31 |

(Continued)

FOREIGN PATENT DOCUMENTS

| CN | 101308588 | 11/2008 |
| CN | 103514408 | 1/2014 |
| EP | 2431904 | 3/2012 |

OTHER PUBLICATIONS

"Vash" Dec. 11, 2011, Retrieved on May 8, 2014 at https://web.archive.org/web/20111211140637/http://thevash.com/docs/README.html.

*Primary Examiner* — Alexander Lagor
*Assistant Examiner* — Kalish K Bell
(74) *Attorney, Agent, or Firm* — Van Pelt, Yi & James LLP

(57) ABSTRACT

Identifying users is disclosed including, in response to receiving an account operating request of an account sent by a user device, obtaining a personal question from a personal questions database and sending the personal question to the user device, receiving, from the user device, a verification response to the personal question, and determining whether a current user is a user associated with the account based at least in part on the verification response and a corresponding standard response in the personal questions database, where the personal question obtained from the personal questions database and the corresponding standard response were generated based at least in part on account operating information of the user associated with the account.

12 Claims, 11 Drawing Sheets

(56) References Cited

U.S. PATENT DOCUMENTS

| | | |
|---|---|---|
| 2002/0069283 A1 | 6/2002 | Lee |
| 2007/0271601 A1 | 11/2007 | Pomerantz et al. |
| 2009/0089876 A1* | 4/2009 | Finamore ................ G06F 21/40 726/21 |
| 2010/0114776 A1* | 5/2010 | Weller .................... G06F 21/31 705/44 |
| 2010/0332993 A1* | 12/2010 | Bousseton ............. G06Q 30/02 715/738 |
| 2011/0191838 A1 | 8/2011 | Yanagihara et al. |
| 2013/0013928 A1* | 1/2013 | Thom ..................... G06F 21/31 713/182 |
| 2013/0144786 A1 | 6/2013 | Tong |
| 2013/0174240 A1* | 7/2013 | Bidare ................. H04L 9/3271 726/7 |
| 2014/0137219 A1* | 5/2014 | Castro .................... H04L 63/08 726/6 |
| 2015/0026796 A1* | 1/2015 | Alan ....................... G06F 21/31 726/19 |
| 2015/0318998 A1* | 11/2015 | Erlikhman ................ H04L 9/32 713/171 |

* cited by examiner

METHOD AND SYSTEM FOR SECURELY IDENTIFYING USERS

CROSS REFERENCE TO OTHER APPLICATIONS

This application claims priority to People's Republic of China Patent Application No. 201410287394.3 entitled A METHOD FOR IDENTIFYING USERS AND A METHOD AND A DEVICE FOR GENERATING SECURITY QUESTIONS, filed Jun. 24, 2014 which is incorporated herein by reference for all purposes.

FIELD OF THE INVENTION

The present application relates to securely identifying users.

BACKGROUND OF THE INVENTION

When a server receives an account operating request from a current user for an operation such as looking up an account password, modifying an account password, revising an account-linked mobile phone number, or revising an account login name, the server typically presents a security question to the current user. The security question is preset by the user associated with the account. If the current user answers the security question correctly, the server determines that the current user is a user associated with the account and permits the current user to perform the aforementioned operation relating to the account.

A limitation of the above approach is that it is very easy for information-stealing tools (e.g., malware installed on the user's device) to obtain answers to security questions from user devices. Thus, the above approach for determining user identity is relatively insecure and results in reduced account security.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
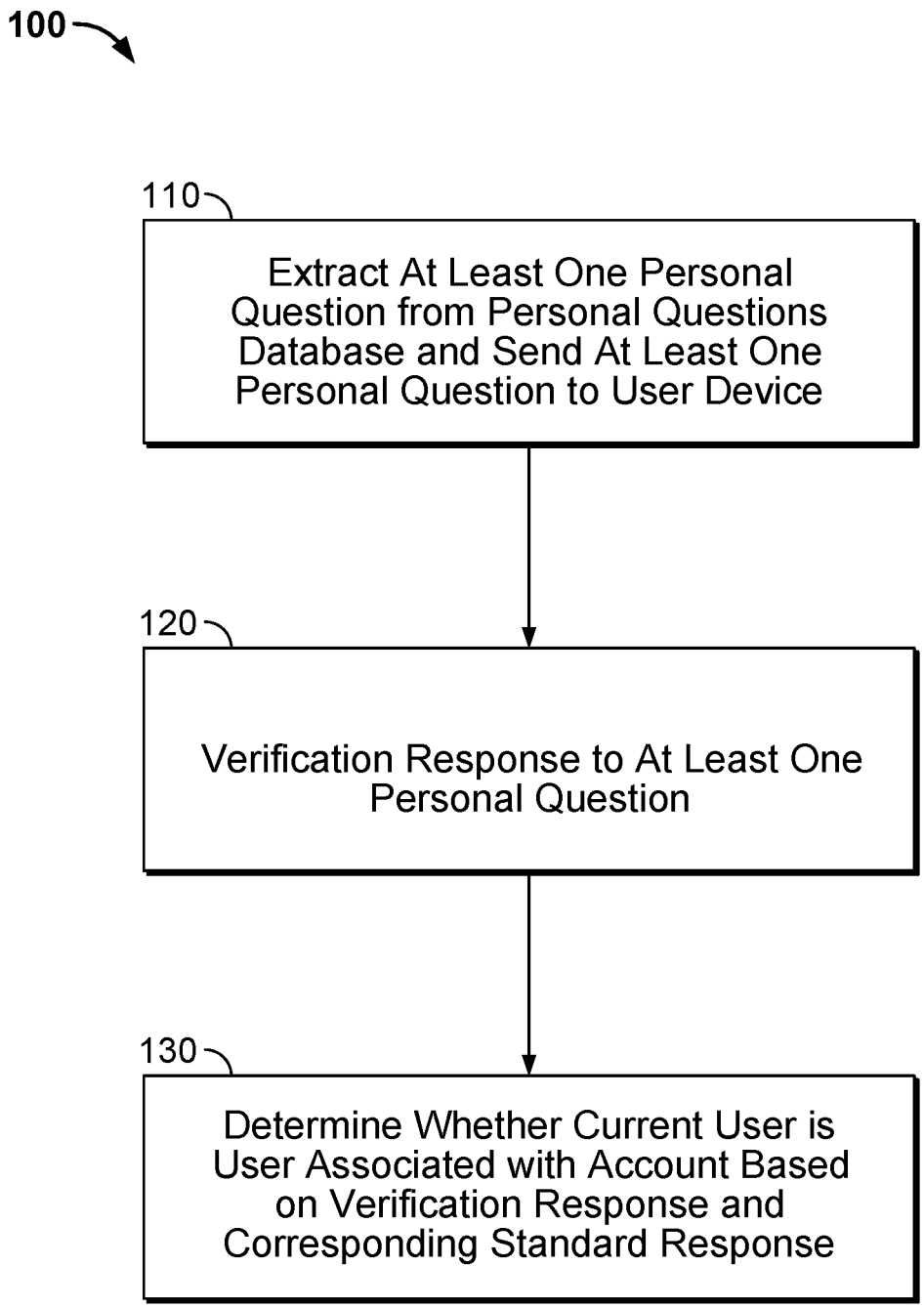
FIG. 1A is a flowchart of an embodiment of a process for identifying a user.

FIG. 1A is a flowchart of an embodiment of a process for identifying a user. In some embodiments, the process 100 is implemented by a server 720 of FIG. 7. Process 100 comprises:

In 110, upon receiving an account operating request sent by a user device, at least one personal question is obtained from a personal questions database and the at least one personal question is sent to the user device.

In some embodiments, the server obtains at least one personal question from the personal questions database and sends the at least one personal question to the user device.

In 120, the server receives, from the user device, a verification response to the at least one personal question.

In 130, the server determines whether the current user is the user associated with the account based on the verification response and a corresponding standard response in the personal questions database.

In the above operations, the personal questions database includes a set of personal questions and corresponding standard responses. The standard responses correspond to correct answers to the personal questions. The personal questions database includes at least one personal question and at least one corresponding standard response. In some embodiments, the personal questions and the corresponding standard responses are automatically generated based on acquired account operating information.

In some embodiments, to generate the personal questions and the corresponding standard responses, the process 100 further comprises: before the obtaining of the at least one personal question from the personal questions database, the server generates, based on the acquired account operating information, a personal question and a corresponding standard response for the personal questions database.

The process 100 imposes no restrictions on specific services whereby the user identification process can be applied. For example, a specific service could relate to looking up an account password, retrieving an account password, revising a mobile phone number or bank card linked to the account, revising an account login name, or other services where the user's identity must be determined to ensure security. For example, the user identification process 100 is used in a third-party payment platform account password retrieval, an account-linked mobile phone number revision, or an account login name revision.

Accordingly, the accounting operating request can be an account password retrieval request, a request to revise the linked mobile phone number, or a request to revise the account login name.

The process 100 does not place any restrictions on the user device. The user device can be a mobile phone, a desktop computer, a notebook computer, a tablet, a smart phone, a wearable device, or any other appropriate computing device.

In some embodiments, "account operating information" refers to data information relating to operations performed by a user on an account. The account operating information can include account registration information, account login information, account payment information, account-bank card linkage information, etc. The account registration information can include registration dates and times, registered personal information, registered mobile phone dynamic verification code information, etc. The account payment information can include payment dates and times, payment amounts, payment details (e.g., payment times, account numbers, and amounts for residential utility payments such as water, electricity, and gas payments), type of bank card used to make credit card payments, payment dates and times, etc. The account login information can include login dates and times, login frequencies, etc. The account-bank card (including cash withdrawal cards, account transfer cards, and fast payment cards) linkage information can include information stored when accounts are linked to bank cards, information stored when bank cards are issued, the information being obtained from bank servers, etc.

Figure 1B:
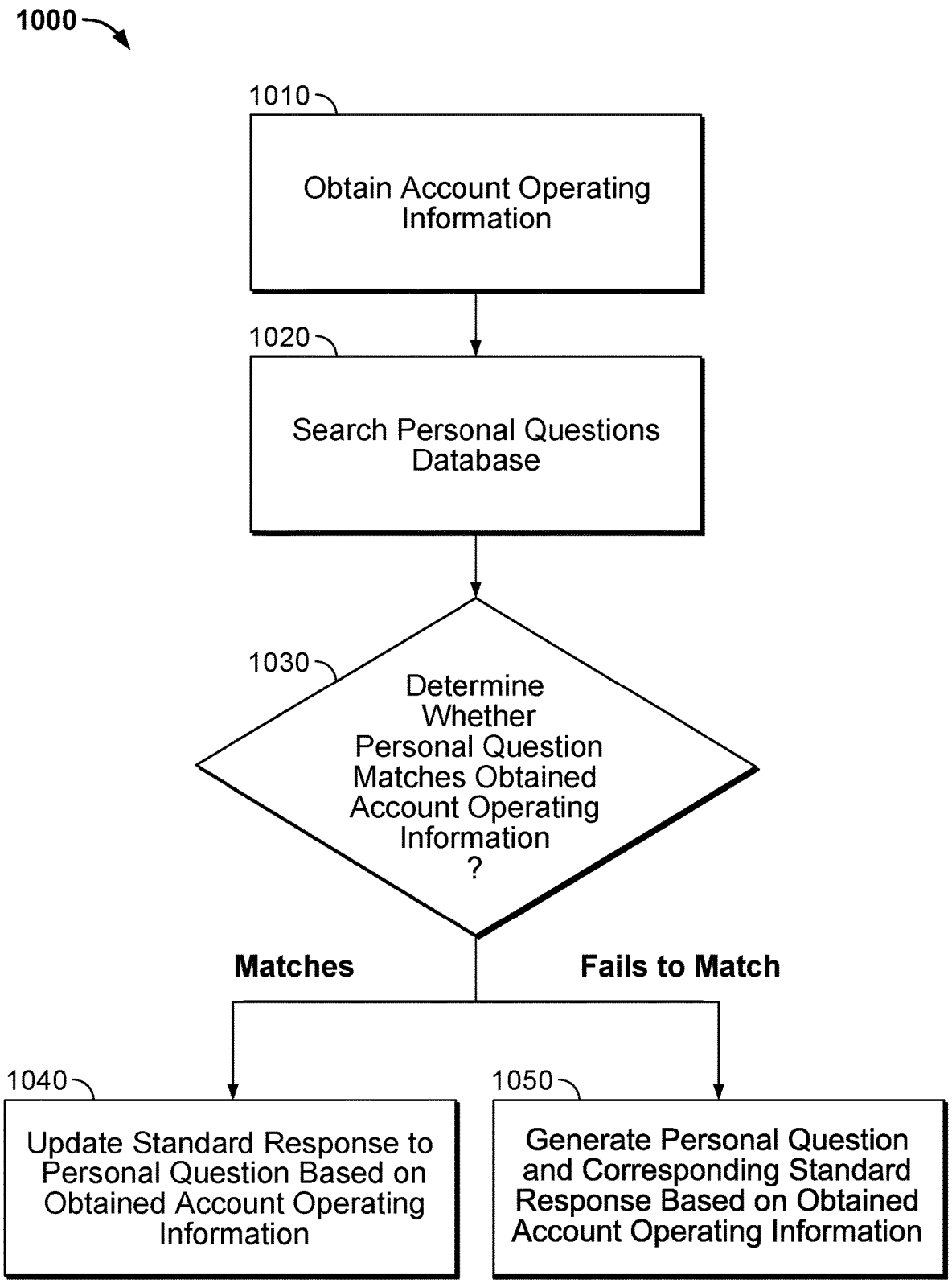
FIG. 1B is a flowchart of an embodiment of a process for updating a personal questions database.

In some embodiments, in process 100, to ensure synchronicity of information in the personal questions database with account operating information, the personal questions database can also be updated. FIG. 1B is a flowchart of an embodiment of a process for updating a personal questions database. In some embodiments, the process 1000 is implemented by a server 720 of FIG. 7 and comprises:

In 1010, account operating information is obtained by directly analyzing the user's activities or post processing activity data of the user.

In 1020, the server searches a personal questions database.

In 1030, the server determines whether a personal question in the personal questions database matches an obtained account operating information. In the event that the server determines that the personal question matches the account operating information, control passes to operation 1040. In the event that the server determines that the personal question fails to match the obtained account operating information, control passes to operation 1050.

In 1040, the server updates a standard response to the personal question based on the obtained account operating information.

In 1050, the server generates a personal question and a corresponding standard response based on the obtained account operating information.

In some embodiments, the personal questions database is dynamically updated based on the account operating information. In some embodiments, the answers or standard responses to personal questions obtained from the personal questions database are also dynamically changed based on account historical operations. If a user is relatively active and regularly logs in or performs account operations, the volume of questions in the personal questions database can be relatively large, and the response data will be refreshed regularly. The security of user identification will thus be higher.

For example, when a user uses an account to make a utility payment, the server obtains an amount of the utility payment, a time or date of the payment, an account number of the payment, and other such account operating information. In some embodiments, personal questions can be looked up in the personal questions database based on the type of account operating information obtained. The following personal questions can be found in association with the above obtained account operating information: "What was the amount of the last utility payment?", "When was the last utility payment?", and "What was the account number of the last utility payment?". If these personal questions are already stored in the personal questions database, then the responses to these personal questions can be updated based on the account operating information. In the event that the user has not previously used the account to make utility payments and these personal questions do not yet exist in the personal questions database, the above personal questions and corresponding standard responses are generated based on the account operating information and stored in the personal questions database.

In some embodiments, the server obtains a personal question from the personal questions database.

In some embodiments, upon determining that the user is associated with a specific status (e.g., logged into a particular account, not logged into the account, etc.), the server obtains at least one question from the personal questions database or a different question database based on the specific status.

For example, in the event that the server determines that the user is logged in to a specific account, account-specific personal questions are obtained from the personal questions database; and in the event that the server determines that the user is logged in to any specific account, more general, non-account specific security questions are obtained from a question database other than the personal questions database. The use of different question databases corresponding to different account statuses allows the acquiring of questions to be more flexible.

Correspondingly, techniques in which different question databases are generated can also be more flexible. For example, if multiple statuses are assigned different numbers (e.g., logged in=1, not logged in=2, etc.), the question database corresponding to status 1 of an account can be generated based on account operating information, while the question database corresponding to status 2 of an account can be generated based on other information such as general, static user information. Static user information includes identification (e.g., driver's license, passport, etc.) number, date of expiration of identification, birthplace, address, time of registration, etc.

In process 100 of FIG. 1A, to ensure that another user cannot discover or guess the standard responses to personal questions based on information displayed on the user's device, the user device hides information relating to the standard responses to the personal questions when the user device is logged in (e.g., by replacing the characters in the responses with special characters). Because the data is anonymized/stripped of sensitive information, certain information cannot be seen even if logged in to the user's device, such as identification numbers, and some activity data has an expiration time, and may not be able to be located after a certain time period, for example, which products were purchased using which credit cards, how much was the purchase amount, etc. Such an approach can ensure that only the user associated with the account will know the standard response to the personal question. Other users, even if logged in to the user's device, are not able to find the standard responses and thus will not be able to revise the password, make payments, or perform other such operations. Account security is thus further enhanced.

In some embodiments, the obtaining of at least one personal question from the personal questions database includes: obtaining personal questions newly generated within a set time segment or personal questions corresponding to standard responses updated within a set time segment, where the end time of the set time segment corresponds to the current time.

In some embodiments, the selecting of the personal question that was generated in the most recent time segment or whose standard response was updated in the most recent time segment can assist the user associated with the account in quickly recalling and finding the standard response. User identification efficiency is thereby increased. Moreover, since the data was updated in the most recent time segment, the standard response to the personal question is more private and cannot be easily acquired from the user device by an information stealing tool such as malware that periodically uploads recorded keystrokes. User identification is thus more secure. For example, a utility payment was made on the account last week, and the personal question can be "What was the amount of the last utility payment?", "On what day was the last utility payment made?", etc.

The process 100 of FIG. 1A can further comprise: when at least a set proportion of the received verification responses is the same as the corresponding standard responses in the personal questions database, perform an operation that matches the account operating request. For example, the set proportion can be 100%, 75%, etc. In the event that the set proportion is 100%, then the server will perform the operation (e.g., permitting the user to revise the password) matched with the account operating request only in the event that all or 100% of the verification responses are correct.

Because the personal questions and the corresponding standard responses in the personal questions database are automatically generated based on account operating information and are not preset by the user in the user device, the responses to the personal questions are not easily acquired from the user device by information-stealing tools when the process 100 is provided. User identification that is performed based on process 100 is more secure for the user accounts.

In various embodiments, process 100 can be performed by a single device or by different devices. For example, the executing entity of operations 110 and 120 can be the server, and the executing entity of operation 130 can be the user device. In another example, the executing entity of operation 110 can be the server, and the executing entity of operations 120 and 130 can be the user device, etc.

Figure 2:
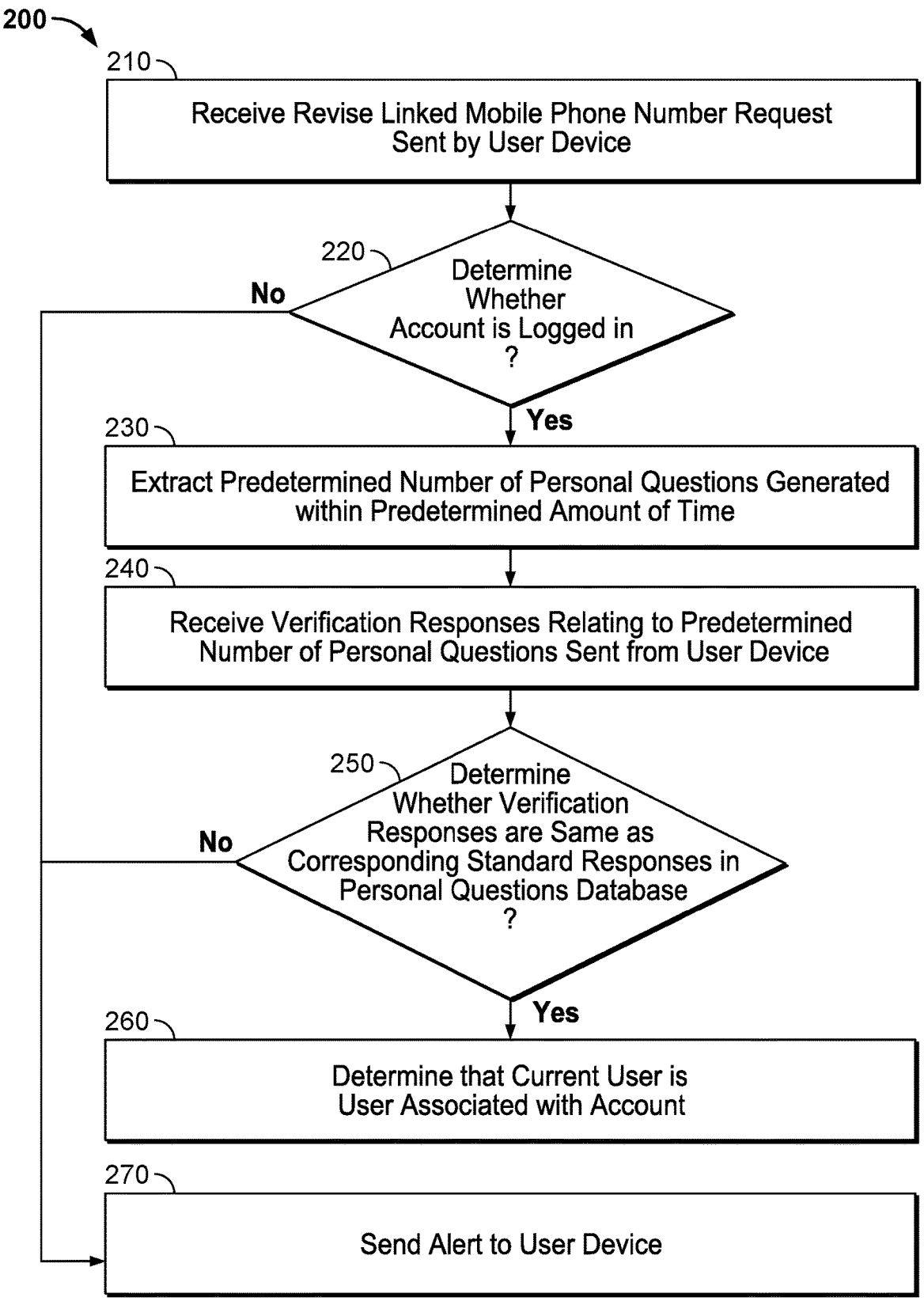
FIG. 2 is a flowchart of another embodiment of a process for identifying a user.

FIG. 2 is a flowchart of another embodiment of a process for identifying a user. In some embodiments, the process 200 is implemented by a server 720 of FIG. 7. Process 200 comprises:

In 210, a request is received to perform an account related action sent by a user device. In this example, the action is to revise a linked mobile phone number.

In 220, the server determines whether the account is logged in. In the event that the account is logged in, control is passed to operation 230. In the event that the account is not logged in, control is passed to operation 270.

In 230, the server obtains a predetermined number of personal questions generated within a predetermined amount of time from the personal questions database and sends the predetermined number of personal questions to the user device.

For example, the predetermined number of personal questions is 3 and the predetermined amount of time is 3 months.

In 240, the server receives verification responses relating to the predetermined number of personal questions sent from the user device.

In 250, the server determines whether the verification responses are the same as corresponding standard responses stored in the personal questions database. In the event that the verification responses are the same as the corresponding standard responses, control is passed to operation 260; otherwise, control is passed to operation 270.

In 260, the server determines that the current user is the user associated with the account and sends an authorization command to perform the requested action on the user's account, such as to modify a linked mobile phone number. In some embodiments, in response to receiving the authorization command, the user device prompts the user to enter the necessary linked mobile phone number.

In 270, the server sends an alert to the user device.

In some embodiments, the alert relates to failure of request to revise linked mobile phone number.

To implement the generation of personal questions and corresponding standard responses, process 200 further includes: prior to the receiving of the revise linked mobile phone number request sent by a user device, the server generates a personal question and a corresponding standard response for the personal questions database based on the acquired account information.

In the event that the user is to retrieve an account password, revise an account login name or password, or revise a linked mobile phone number, the process of determining user identity shown in process 200 can be used. The determining of the user identification that is implemented through process 200 is more secure, and therefore account security is increased.

Figure 3:
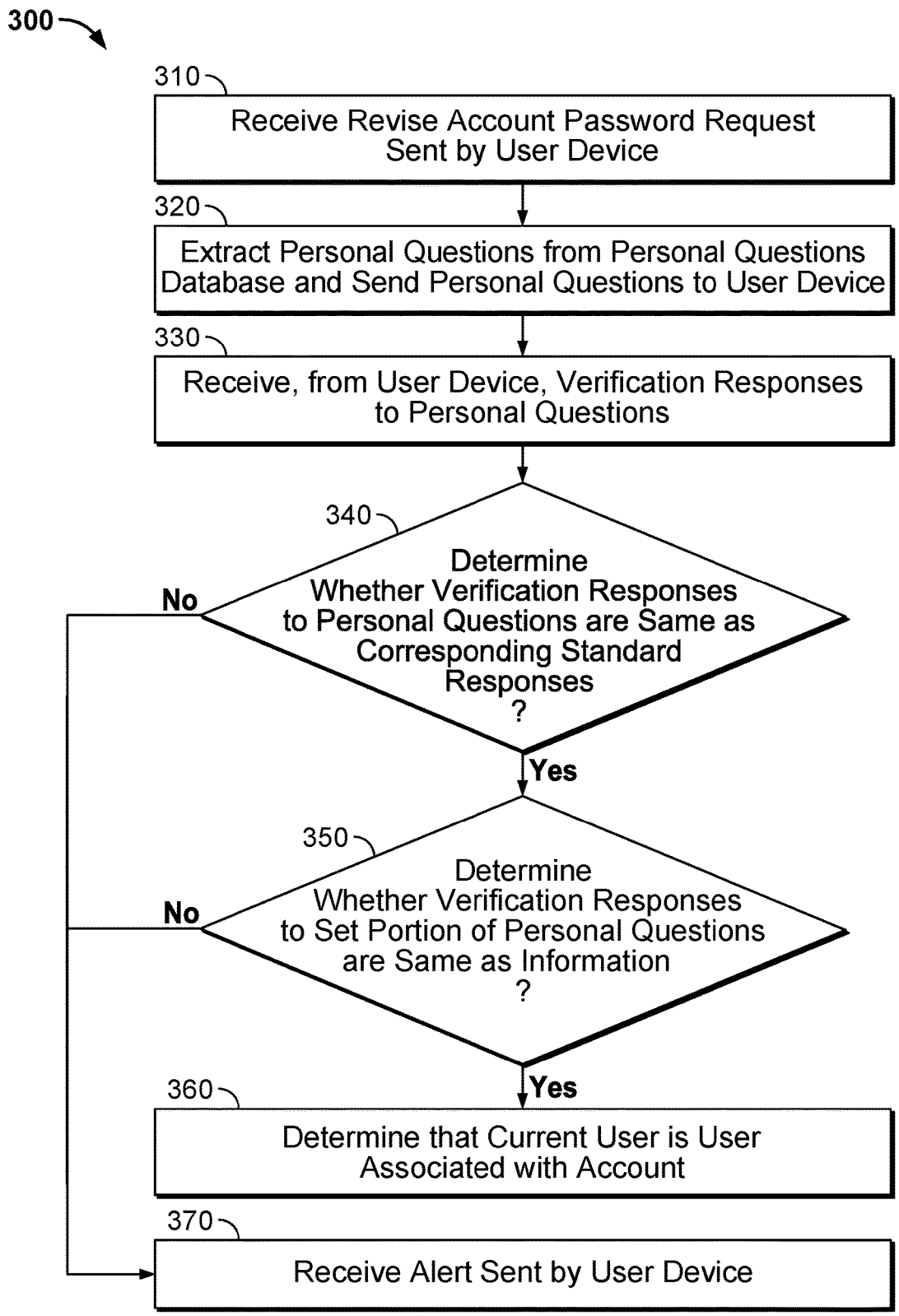
FIG. 3 is a flowchart of another embodiment of a process for identifying a user.

FIG. 3 is a flowchart of another embodiment of a process for identifying a user. In some embodiments, the process 300 is implemented by a server 720 of FIG. 7 and comprises:

In 310, the server receives a revise account password request sent by a user device.

In 320, the server obtains personal questions from a personal questions database and sends the personal questions to the user device.

In this example, the personal questions include personal questions A-D. Specifically, Personal question A: What is the account-linked bank card number?

Personal question B: What is the user identification number (e.g., driver's license number, passport number, etc.) when account was linked to bank card?

Personal question C: What is the mobile phone number recorded when account was linked to bank card.

Personal question D: What is the dynamic alphanumeric check code received by the mobile phone (e.g., a code sent via a text message, SMS message, etc.) and stored on the mobile phone when account was linked to bank card.

In 330, the server receives, from the user device, verification responses to the personal questions.

In 340, the server determines whether the verification responses to the personal questions are the same as corresponding standard responses in the personal questions database. In the event that the verification responses are the same as the corresponding standard responses, control passes to operation 350; otherwise, control passes to operation 370.

In 350, the server determines whether the verification responses to at least a set portion of the personal questions are the same as information stored when the bank card was issued. In the event that the verification responses to at least the set portion of the personal questions are the same as information stored when the bank card was issued, control passes to operation 360; otherwise, control passes to operation 370. For example, the set personal questions correspond to personal questions A-C.

In 360, the server determines that the current user is the user associated with the account and sends an "authorization to revise account password" command to the user device prompting the user to enter a revised account password.

In 370, the server receives an alert sent by the user device. In some embodiments, the alert is a "failure of request to revise account password" alert.

In order to generate personal questions and corresponding standard responses, process 300 can, prior to the execution of operation 310, further generate a personal question and a corresponding standard response for the personal questions database based on the acquired account information.

When the user is to revise the account password, the user identification that is implemented through process 300 is more secure and increases the security of accounts.

Figure 4A:
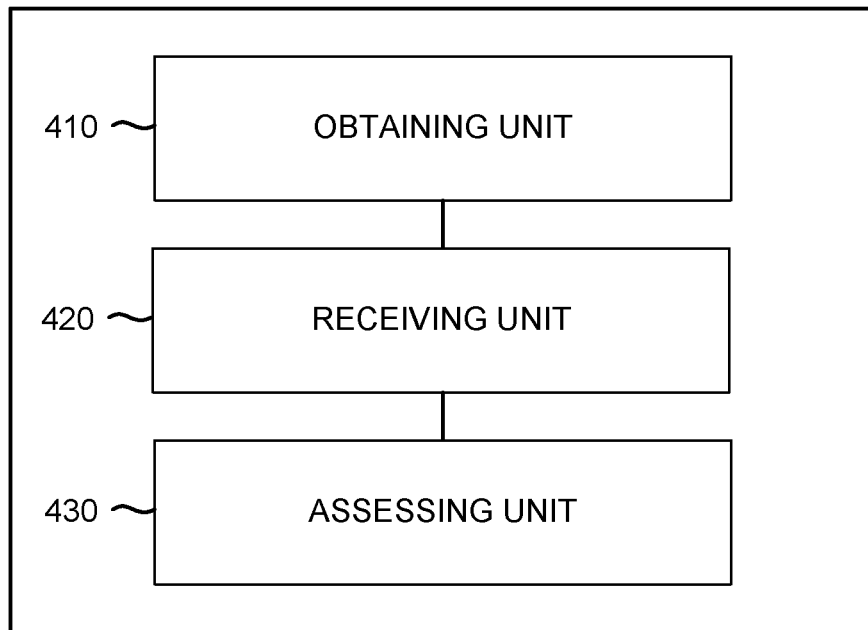
FIG. 4A is a structural diagram of an embodiment of a device for identifying a user.

FIG. 4A is a structural diagram of an embodiment of a device for identifying a user. In some embodiments, the device 400 implements the process 100 of FIG. 1A and comprises: an obtaining unit 410, a receiving unit 420, and an assessing unit 430.

In some embodiments, the obtaining unit 410 obtains, upon receiving an account operating request sent by a user device, at least one personal question from a personal questions database and sends the at least one personal question to the user device.

In some embodiments, the receiving unit 420 receives, from the user device, a verification response to the at least one personal question.

In some embodiments, the assessing unit 430 determines whether the current user is the user associated with the account based on the verification responses and the corresponding standard responses in the personal questions database.

In some embodiments, the verification responses of the personal questions database and the corresponding standard responses were generated based on account operating information acquired by a server.

Figure 4B:
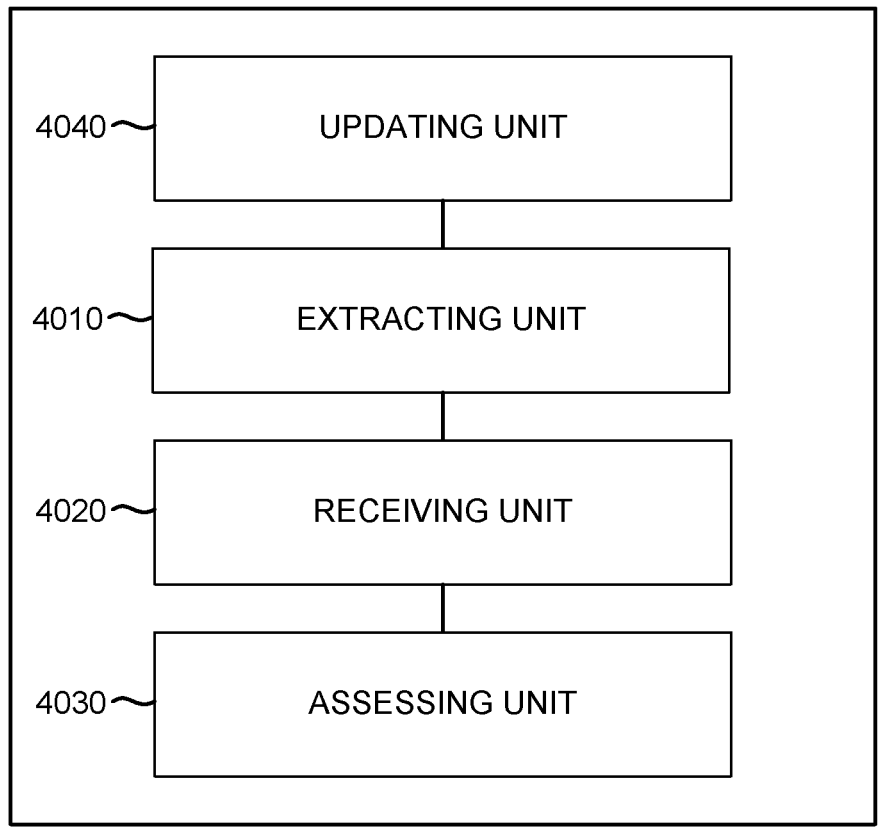
FIG. 4B is a structural diagram of another embodiment of a device for identifying a user.

FIG. 4B is a structural diagram of another embodiment of a device for identifying a user. In some embodiments, the device 4000 corresponds to the device 400 of FIG. 4A and further comprises an updating unit 4040.

In some embodiments, the obtaining unit 410, the receiving unit 420, and the assessing unit 430 of FIG. 4A correspond to an obtaining unit 4010, a receiving unit 4020, and an assessing unit 4030.

In some embodiments, the updating unit 4040 obtains user account information. In the event that a personal question matches the obtained user account information found in the personal questions database, the updating unit 4040 updates the standard response to the personal question based on the obtained account operating information. In the event that no personal question matches the obtained user account information found in the personal questions database, the updating unit 4040 generates a personal question and a corresponding standard response based on the obtained account information.

Figure 4C:
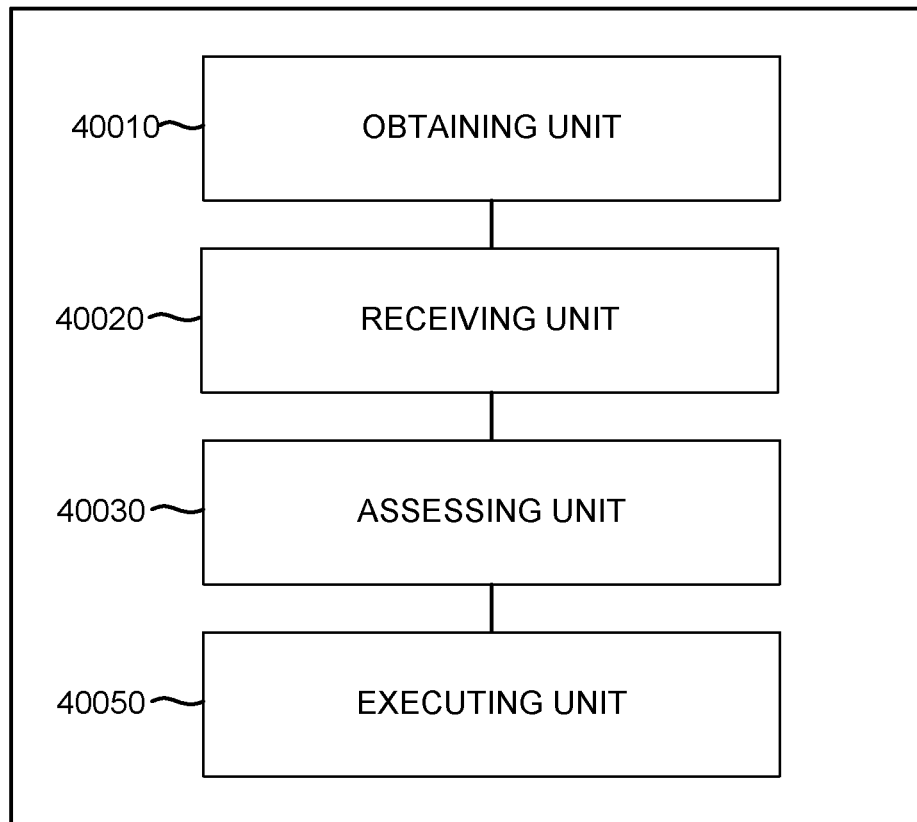
FIG. 4C is a structural diagram of another embodiment of a device for identifying a user.

FIG. 4C is a structural diagram of another embodiment of a device for identifying a user. In some embodiments, the device 40000 corresponds to the device 400 of FIG. 4A and further comprises an executing unit 40050.

In some embodiments, the obtaining unit 410, the receiving unit 420, and the assessing unit 430 of FIG. 4A correspond to an obtaining unit 40010, a receiving unit 40020, and an assessing unit 40030.

In some embodiments, in the event that verification responses in excess of a set proportion of the received verification responses are the same as the corresponding standard responses in the personal questions database, the executing unit 40050 performs an operation that matches the account operating request.

Referring back to FIG. 4A, in some embodiments, in the device 400, the obtaining unit 410 specifically obtains at least one personal question from the personal questions database when the obtaining unit 410 determines that the account has a specific status. In some embodiments, the obtaining unit 410 also specifically obtains personal questions newly generated within a set time segment or personal questions corresponding to standard responses updated within a set time segment, the end time of the set time segment being the current time.

Because the personal questions and the corresponding standard responses in the personal questions database are automatically generated based on account operating information and are not preset by the user in the user device, the responses to the personal questions are not easily acquired from the user device by information-stealing tools when the device 400 is employed. User identification that is implemented using the device 400 is more secure and increases the security of accounts.

Figure 5:
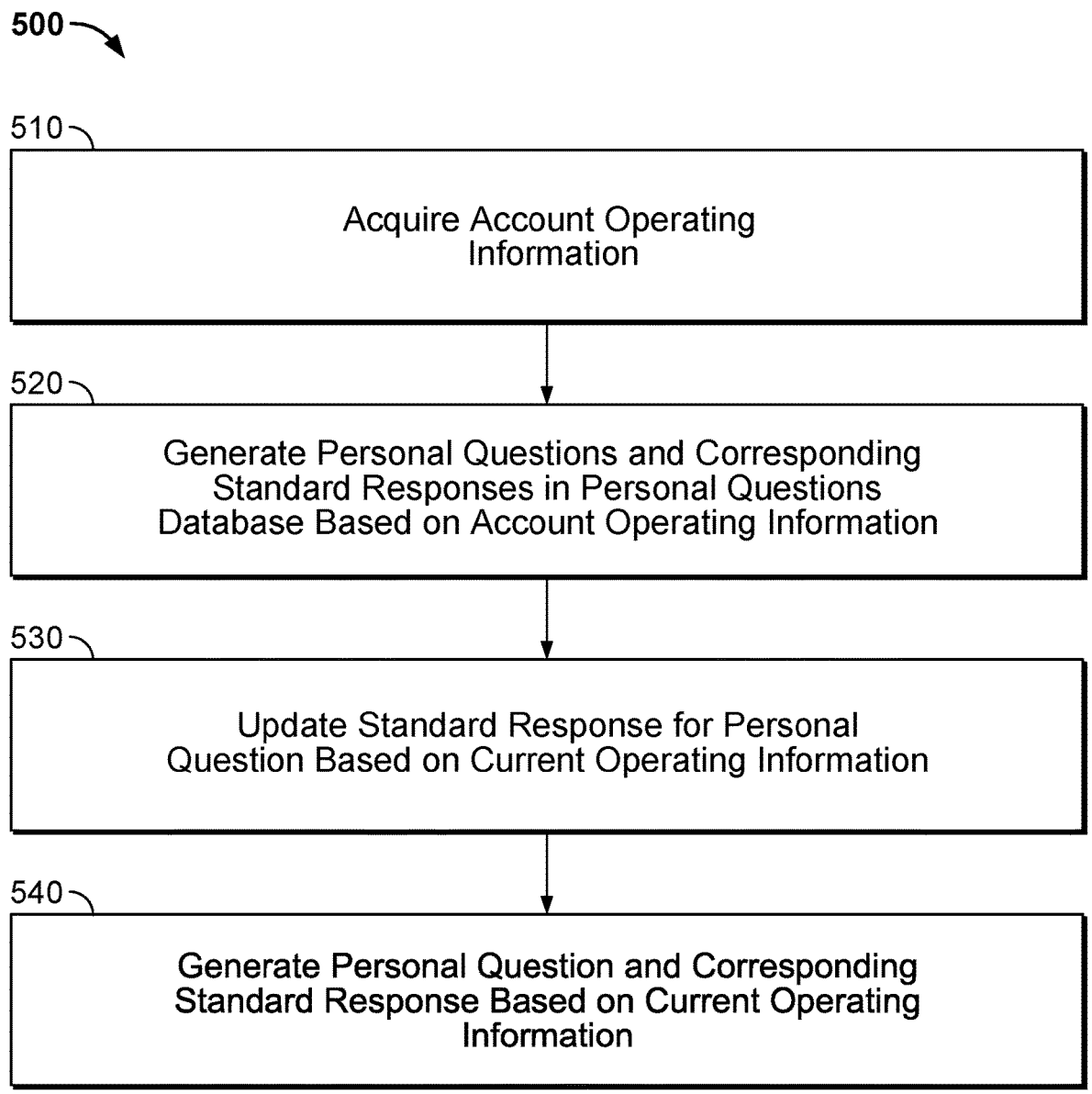
FIG. 5 is a flowchart of an embodiment of a process for generating a security question.

FIG. 5 is a flowchart of an embodiment of a process for generating a security question. In some embodiments, the process 500 is implemented by a server 720 of FIG. 7 and comprises:

In 510, the server acquires account operating information.

In 520, the server generates personal questions and corresponding standard responses in a personal questions database based on the account operating information.

"Account operating information" refers to data information relating to operations performed by a user on an account. The "account operating information" includes account registration information, account login information, account payment information, account-bank card linkage information, etc.

In some embodiments, the process 500 further comprises:

In 530, upon finding a personal question in the personal questions database matching the current account operating information, the server updates the standard response for the personal question based on the current account operating information.

In 540, upon failing to find a personal question in the personal questions database matching the current operating information, the server generates a personal question and corresponding standard response based on the current account operating information.

Because the personal questions and the corresponding standard responses in the personal questions database are automatically generated based on the account operating information and are not preset by the user in the user device, responses to the personal questions are not easily acquired from the user device by information-stealing tools. User identification that implements this process 500 for generating security questions is more secure and increases the security of accounts.

Figure 6:
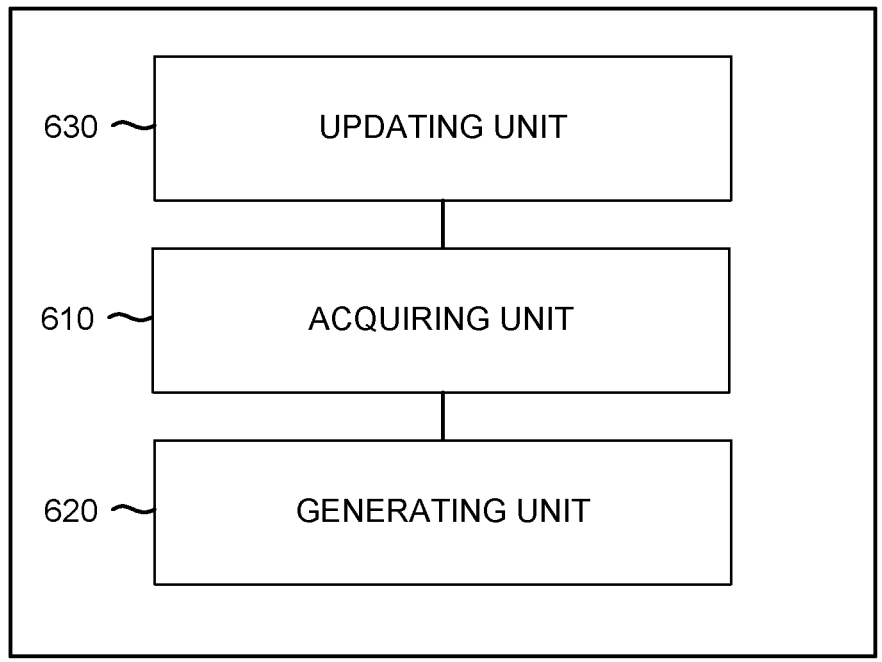
FIG. 6 is a structural diagram of an embodiment of a device for generating a security question.

FIG. 6 is a structural diagram of an embodiment of a device for generating a security question. In some embodiments, the device 600 implements the process 500 of FIG. 5 and comprises: an acquiring unit 610 and a generating unit 620.

In some embodiments, the acquiring unit 610 acquires account operating information.

In some embodiments, the generating unit 620 generates personal questions and corresponding standard responses in a personal questions database based on the account operating information.

In some embodiments, the device 600 further comprises an updating unit 630.

In some embodiments, in the event that a personal question matches the current operating information found in the personal questions database, the updating unit 630 updates the standard response to the personal question based on the current operating information, and in the event that no personal question matches the current operating information found in the personal questions database, the updating unit 630 generates a personal question and a corresponding standard response based on the current account operating information.

When the device 600 is used in user identification, the responses to personal questions are not easily acquired by information-stealing tools from the user device. User identification is more secure, and increases the security of accounts.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

Figure 7:
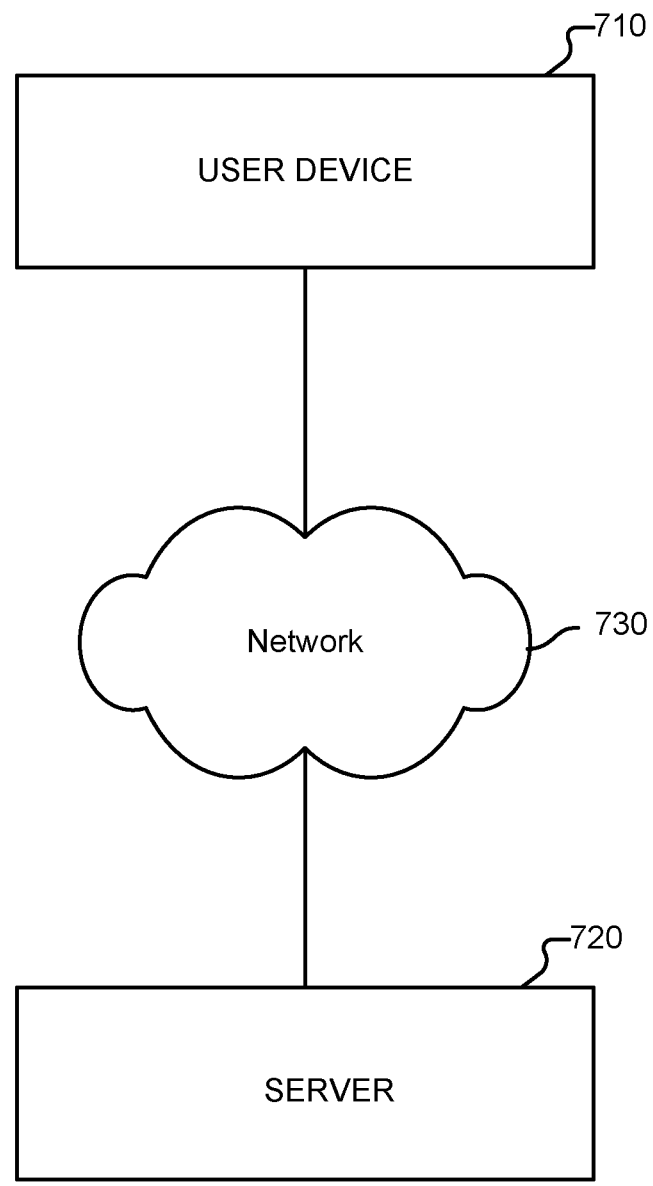
FIG. 7 is a diagram of an embodiment of a system for identifying a user.

FIG. 7 is a diagram of an embodiment of a system for identifying a user. In some embodiments, the system 700 includes a user device 710 and a server 720. The user device 710 and the server 720 are connected to each other via a network 730.

The user device 710 sends an account operating request to the server 720. The server 720 obtains a personal question from a personal questions database and sends the obtained personal question to the user device 710.

A user using the user device 710 answers the personal question and sends a response to the server 720. The server 720 receives the response to the personal question from the user device 710.

The server 720 determines whether the current user is a user associated with the account based on the response and a standard response in the personal questions database.

Figure 8:
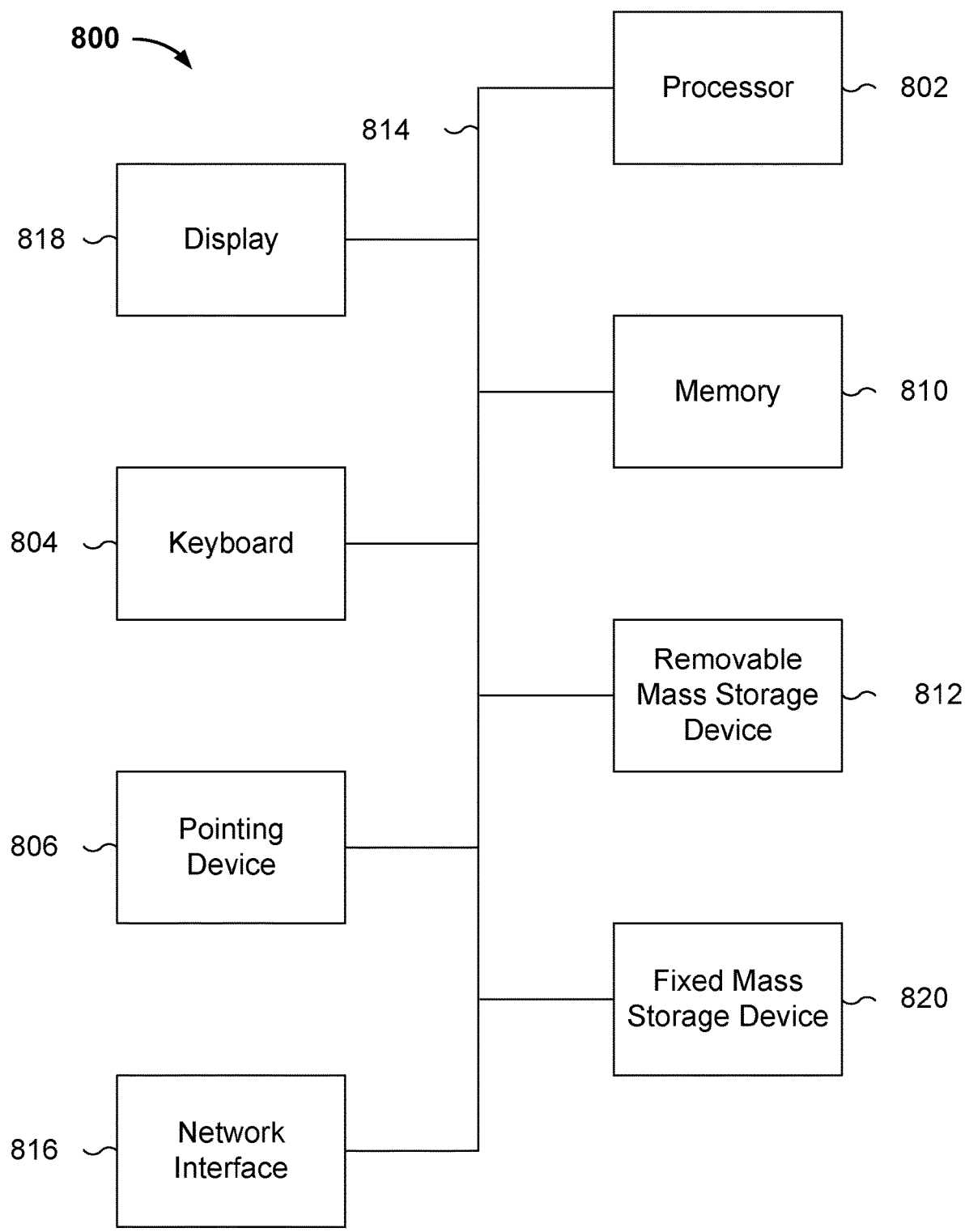
FIG. 8 is a diagram of an embodiment of a computer system for identifying a user.

FIG. 8 is a functional diagram illustrating an embodiment of a programmed computer system for identifying a user. As will be apparent, other computer system architectures and configurations can be used to identify a user. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
in response to receiving an account operating request of an account sent by a user device, obtaining a personal question from a personal questions database and sending the personal question to the user device, wherein the obtaining of the personal question from the personal questions database comprises:
  determining whether the user device is logged in or not logged in;
  selecting a first personal questions database or a second personal questions database depending on whether the user device is logged in or not logged in, respectively, the first personal questions database being different from the second personal questions database, wherein the first personal questions database is generated based on account operating information, the account operating information comprising: account registration information, account login information, account-bank card linkage information, information stored when accounts are linked to bank cards, information stored when bank cards are issued, or any combination thereof, and wherein the second personal questions database is generated based on static user information, the static user information including identification number, driver's license number, passport number, date of expiration of identification, birthplace, time of registration, or any combination thereof; and
  obtaining, from the selected personal questions database, the personal question;
receiving, from the user device, a verification response to the personal question;
determining whether a current user is a user associated with the account based at least in part on the verification response and a corresponding standard response in the personal questions database, wherein the personal question obtained from the personal questions database and the corresponding standard response were generated based at least in part on the account operating information of the user associated with the account;
obtaining updated account operating information, the updated account operating information being different from the account operating information;
determining whether the updated account operating information is associated with at least one personal question in the personal questions database; and
in response to a determination that the updated account operating information fails to match any personal question in the personal questions database:
  generating a new personal question and a corresponding standard response depending on whether the user device is logged in or not logged in, wherein the new personal question is generated based on the obtained updated account operating information in the event that the user device is logged in, or the new personal question is generated based on the static user information in the event that in the event that the user device is not logged in.

2. The method as described in claim 1, wherein the obtaining of the personal question from the personal questions database comprises:
upon determining that the account has a specific status, obtaining the personal question from the personal questions database that corresponds to the specific status.

3. The method as described in claim 1, further comprising:
in response to a determination that a verification response in excess of a set proportion of the received verification response is the same as the corresponding standard response in the personal questions database, performing an operation that matches the account operating request.

4. The method as described in claim 1, wherein in response to a determination that the user device is logged in, the user device hides information relating to standard responses to personal questions.

5. The method as described in claim 1, wherein the account operating request comprises: an account password retrieval request, a request to revise a linked mobile phone number, or a request to revise an account login name.

6. A device, comprising:
at least one processor configured to:
  in response to receiving an account operating request of an account sent by a user device, obtain a personal question from a personal questions database and send the personal question to the user device, wherein the obtaining of the personal question from the personal questions database comprises:
    determine whether the user device is logged in or not logged in;
    select a first personal questions database or a second personal questions database depending on whether the user device is logged in or not logged in, respectively, the first personal questions database being different from the second personal questions database, wherein the first personal questions database is generated based on account operating information, the account operating information comprising: account registration information, account login information, account-bank card linkage information, information stored when accounts are linked to bank cards, information stored when bank cards are issued, or any combination thereof, and wherein the second personal questions database is generated based on static user information, the static user information including identification number, driver's license number, passport number, date of expiration of identification, birthplace, time of registration, or any combination thereof; and
    obtain, from the selected personal questions database, the personal question;
receive, from the user device, a verification response to the personal question;
determine whether a current user is a user associated with the account based at least in part on the verification response and a corresponding standard response in the personal questions database, wherein the personal question obtained from the personal questions database and the corresponding standard response were generated based at least in part on the account operating information of the user associated with the account;
obtain updated account operating information, the updated account operating information being different from the account operating information;
determine whether the updated account operating information is associated with at least one personal question in the personal questions database; and
in response to a determination that the updated account operating information fails to match any personal question in the personal questions database:
    generate a new personal question and a corresponding standard response depending on whether the user device is logged in or not logged in, wherein the new personal question is generated based on the obtained updated account operating information in the event that the user device is logged in, or the new personal question is generated based on the static user information in the event that in the event that the user device is not logged in; and
a memory coupled to the at least one processor and configured to provide the at least one processor with instructions.

7. The device as described in claim 6, wherein the obtaining of the personal question from the personal questions database comprises to:
    upon determining that the account has a specific status, obtain the personal question from the personal questions database that corresponds to the specific status.

8. The device as described in claim 6, wherein the at least one processor is further configured to:

in response to a determination that a verification response in excess of a set proportion of the received verification response is the same as the corresponding standard response in the personal questions database, perform an operation that matches the account operating request.

9. A method, comprising:
acquiring account operating information;
generating, based on the account operating information, personal questions and corresponding standard responses, wherein the account operating information comprises: account registration information, account login information, account-bank card linkage information, information stored when accounts are linked to bank cards, information stored when bank cards are issued, or any combination thereof;
storing the personal questions and standard responses in a personal questions database;
determining whether a personal question in the personal questions database matches the acquired account operating information;
upon locating, in the personal questions database, the personal question matching the acquired account operating information, updating a standard response for the personal question based on the acquired account operating information;
obtaining updated account operating information, the updated account operating information being different from the account operating information;
determining whether the updated account operating information is associated with at least one personal question in the personal questions database; and
in response to a determination that the updated account operating information fails to match any personal question in the personal questions database:
    generating a new personal question and a corresponding standard response depending on whether the user device is logged in or not logged in, wherein the new personal question is generated based on the obtained updated account operating information in the event that the user device is logged in, or the new personal question is generated based on the static user information in the event that in the event that the user device is not logged in.

10. A device for generating security questions, comprising:
at least one processor configured to:
    acquire account operating information;
    generate, based on the account operating information, personal questions and corresponding standard responses, wherein the account operating information comprises: account registration information, account login information, account-bank card linkage information, information stored when accounts are linked to bank cards, information stored when bank cards are issued, or any combination thereof;
    store the personal questions and standard responses in a personal questions database;
    determine whether a personal question in the personal questions database matches the acquired account operating information;
    upon locating, in the personal questions database, the personal question matching the acquired account operating information, update a standard response for the personal question based on the acquired account operating information;

obtain updated account operating information, the updated account operating information being different from the account operating information;

determine whether the updated account operating information is associated with at least one personal question in the personal questions database; and in response to a determination that the updated account operating information fails to match any personal question in the personal questions database:

generate a new personal question and a corresponding standard response depending on whether the user device is logged in or not logged in, wherein the new personal question is generated based on the obtained updated account operating information in the event that the user device is logged in, or the new personal question is generated based on the static user information in the event that in the event that the user device is not logged in; and a memory coupled to the at least one processor and configured to provide the at least one processor with instructions.

11. A computer program product being embodied in a tangible non-transitory computer readable storage medium and comprising computer instructions for:

in response to receiving an account operating request of an account sent by a user device, obtaining a personal question from a personal questions database and sending the personal question to the user device, wherein the obtaining of the personal question from the personal questions database comprises:

determining whether the user device is logged in or not logged in;

selecting a first personal questions database or a second personal questions database depending on whether the user device is logged in or not logged in, respectively, the first personal questions database being different from the second personal questions database, wherein the first personal questions database is generated based on account operating information, the account operating information comprising: account registration information, account login information, account-bank card linkage information, information stored when accounts are linked to bank cards, information stored when bank cards are issued, or any combination thereof, and wherein the second personal questions database is generated based on static user information, the static user information including identification number, driver's license number, passport number, date of expiration of identification, birthplace, time of registration, or any combination thereof; and obtaining, from the selected personal questions database, the personal question;

receiving, from the user device, a verification response to the personal question;

determining whether a current user is a user associated with the account based at least in part on the verification response and a corresponding standard response in the personal questions database, wherein the personal question obtained from the personal questions database and the corresponding standard response were generated based at least in part on the account operating information of the user associated with the account;

obtaining updated account operating information, the updated account operating information being different from the account operating information;

determining whether the updated account operating information is associated with at least one personal question in the personal questions database; and in response to a determination that the updated account operating information fails to match any personal question in the personal questions database:

generating a new personal question and a corresponding standard response depending on whether the user device is logged in or not logged in, wherein the new personal question is generated based on the obtained updated account operating information in the event that the user device is logged in, or the new personal question is generated based on the static user information in the event that in the event that the user device is not logged in.

12. A computer program product being embodied in a tangible non-transitory computer readable storage medium and comprising computer instructions for:

acquiring account operating information;

generating, based on the account operating information, personal questions and corresponding standard responses, wherein the account operating information comprises: account registration information, account login information, account-bank card linkage information, information stored when accounts are linked to bank cards, information stored when bank cards are issued, or any combination thereof; storing the personal questions and standard responses in a personal questions database;

determining whether a personal question in the personal questions database matches the acquired account operating information; and upon locating, in the personal questions database, the personal question matching the acquired account operating information, updating a standard response for the personal question based on the acquired account operating information;

obtaining updated account operating information, the updated account operating information being different from the account operating information;

determining whether the updated account operating information is associated with at least one personal question in the personal questions database; and in response to a determination that the updated account operating information fails to match any personal question in the personal questions database:

generating a new personal question and a corresponding standard response depending on whether the user device is logged in or not logged in, wherein the new personal question is generated based on the obtained updated account operating information in the event that the user device is logged in, or the new personal question is generated based on the static user information in the event that in the event that the user device is not logged in.

* * * * *